United States Patent
Koehler et al.

(10) Patent No.: US 7,900,351 B2
(45) Date of Patent: Mar. 8, 2011

(54) METHOD FOR THE PRODUCTION OF GAS TURBINE ROTORS HAVING INTEGRATED BLADING

(75) Inventors: Christian Koehler, Dachau (DE); Klaus Murr, Warngau (DE); Waldemar Schauer, Mering (DE)

(73) Assignee: MTU Aero Engines GmbH, Munich (DE)

(*) Notice: Subject to any disclaimer, the term of this patent is extended or adjusted under 35 U.S.C. 154(b) by 1403 days.

(21) Appl. No.: 10/570,107

(22) PCT Filed: Aug. 14, 2004

(86) PCT No.: PCT/DE2004/001815
§ 371 (c)(1),
(2), (4) Date: Mar. 1, 2006

(87) PCT Pub. No.: WO2005/024185
PCT Pub. Date: Mar. 17, 2005

(65) Prior Publication Data
US 2007/0039179 A1    Feb. 22, 2007

(30) Foreign Application Priority Data
Sep. 3, 2003 (DE) .................... 103 40 520

(51) Int. Cl.
*B21K 25/00* (2006.01)
(52) U.S. Cl. .......... 29/889.21; 29/889.2; 29/889.23; 29/889.7; 29/557; 416/234

(58) Field of Classification Search ............ 29/889.2, 29/889.23, 557, 889.7–889.722; 416/234, 416/241 R; 451/49
See application file for complete search history.

(56) References Cited

U.S. PATENT DOCUMENTS

| 4,512,115 | A  | * | 4/1985  | Miller ............................ 451/49 |
| 4,873,751 | A  |   | 10/1989 | Walker et al. ................ 29/156.8 |
| 5,188,275 | A  |   | 2/1993  | Daines ............................. 228/2 |
| 6,095,402 | A  |   | 8/2000  | Brownell et al. ........... 228/112.1 |
| 6,178,633 | B1 | * | 1/2001  | Yamane ...................... 29/889.7 |
| 6,219,916 | B1 | * | 4/2001  | Walker et al. ............. 29/889.21 |
| 6,233,823 | B1 | * | 5/2001  | Schilling ................... 29/889.71 |
| 6,905,312 | B2 | * | 6/2005  | Bourgy et al. ................ 416/234 |
| 6,991,434 | B2 | * | 1/2006  | Heinrich et al. .......... 416/241 R |
| 2002/0014006 | A1 |   | 2/2002  | Brock .......................... 29/889.7 |

FOREIGN PATENT DOCUMENTS

| EP | 0 376 874 | 7/1990 |
| EP | 0 887 143 | 12/1998 |
| GB | 1118954   | 7/1968 |

* cited by examiner

*Primary Examiner* — Rick K Chang
(74) *Attorney, Agent, or Firm* — Davidson, Davidson & Kappel, LLC

(57) ABSTRACT

A method is provided for the production of gas turbine rotors with integrated blading. In a first step, rotating blades are produced. Subsequently, at least one of the produced rotating blade blanks is connected to the rotor bearing, then the or each of the rotating blade blanks connected to the rotor bearing are processed to form a nominal shape of the or each rotating blade. Consequently, the end contours of the gar turbine rotor with integrated balding are finely processed.

20 Claims, 2 Drawing Sheets

METHOD FOR THE PRODUCTION OF GAS TURBINE ROTORS HAVING INTEGRATED BLADING

FIELD OF THE INVENTION

The present invention relates to a method for manufacturing gas turbine rotors having integral blading.

BACKGROUND

Depending on whether a rotor or rotor carrier is disk-shaped or annular in cross section, gas turbine rotors having integral blading are known as blisks or blings. Disk-shaped gas turbine rotors having integral blading are described as blisks (bladed disks), and annular gas turbine rotors having integral blading are described as blings (bladed rings).

From the related art, it is known to manufacture gas turbine rotors having integral blading in a process described as milling from a solid blank. The process of milling from a solid blank is primarily used in the manufacture of relatively small gas tubine rotors. Thus, the process of milling from a solid blank is particularly suited for the series production of blisks or blings having relatively small titanium blades. It is problematic to mill blisks or blings from a nickel alloy due to the poor cutting properties of the material.

Another method known from the related art for manufacturing gas turbine rotors having integral blading provides for attaching prefabricated rotor blades to the rotor carrier or to the hub using a suitable joining process, for example so-called linear friction welding or so-called inductive pressure welding, or also diffusion welding. When manufacturing relatively large gas turbine rotors or gas turbine rotors having relatively large blades, the process of attaching prefabricated rotor blades to the rotor carrier is more economical and cost-effective than the process of milling from a solid blank.

In the last-mentioned method known from the related art for manufacturing gas turbine rotors having integral blading, prefabricated rotor blades are attached to the rotor carrier. These factory prepared rotor blades are, in particular, forged parts, which, with respect to their geometric design, especially their thickness, have already been adapted to the nominal shape of the rotor blades of the gas turbine rotor. This means that, under the related art methods, the finished rotor blades attached to the rotor carrier are, for the most part, already finish-machined. Under the related art, following the joining operation, it is merely necessary to finely machine, namely surface-machine the prefabricated rotor blades. Attaching substantially finish-machined rotor blades to the rotor carrier necessitates a costly adaptation between an attachment site for the blade root on the rotor carrier and the finished geometry of the rotor blade, in order to be able to compensate for positional deviations inherent in the joining process. This adaptation is very complex and thus increases the cost of manufacturing gas turbine rotors having integral blading. Moreover, the largely finish-machined rotor blades, which, under the related art methods, are attached to a rotor carrier, are components that typically must be purchased at a high cost from outside suppliers. This also makes it expensive to manufacture gas turbine rotors having integral blading.

Against this background, the object of the present invention is to devise a novel method for manufacturing gas turbine rotors having integral blading.

In accordance with an embodiment of the present invention, a method is provided for manufacturing a gas turbine rotor having integral blading, comprising the steps of producing unmachined rotor blade parts, joining at least one of the unmachined rotor blade parts to a rotor carrier, machining the unmachined rotor blade part(s) attached to the rotor carrier to a nominal shape of a rotor blade(s), and thereafter, finely machining the unmachined rotor blade part(s) to end contours of the gas turbine rotor having integral blading. In accordance with one variant of this embodiment the step of producing includes separating raw rotor blade parts out of a strip-shaped or band-shaped material of substantially uniform thickness and, thereafter, cambering and twisting said raw rotor blade parts to produce unmachined rotor blade parts, each of the unmachined rotor blade parts having a substantially uniform thickness and a desired three-dimensional twist. In accordance with another variant of this embodiment, the step of producing includes separating raw rotor blade parts out of an extruded profile of a substantially uniform thickness.

DETAILED DESCRIPTION

In accordance with the present invention, unmachined rotor blade parts are manufactured in a first step. In a second step, at least one manufactured, unmachined rotor blade part is subsequently joined to a rotor carrier. In a third step, the or each unmachined rotor blade part joined to the rotor carrier is machined to a nominal shape of the or of each rotor blade; subsequently thereto, a fine machining to end contours of the gas turbine rotor having integral blading being carried out in a fourth step.

The unmachined rotor blade parts preferably have a substantially uniform thickness in cross section and are preferably manufactured from a semifinished product. The actual shaping operation, thus the adaptation of the unmachined rotor blade parts to the nominal shape of the rotor blades, is not carried out until after the unmachined rotor blade parts have been joined to the rotor carrier. The need is eliminated for the complex adaptation between the attachment site for the blade root on the rotor carrier and the finished geometry of the rotor blades, as required under related art methods. The need is also eliminated for purchasing expensive, substantially finish-machined rotor blades. This makes it possible for gas turbine rotors having integral blading to be manufactured more cost-effectively.

Preferred embodiments of the present invention are derived from the dependent claims and from the following description. The present invention is described in greater detail in the following on the basis of exemplary embodiments, without being limited thereto.

Figure 1A:
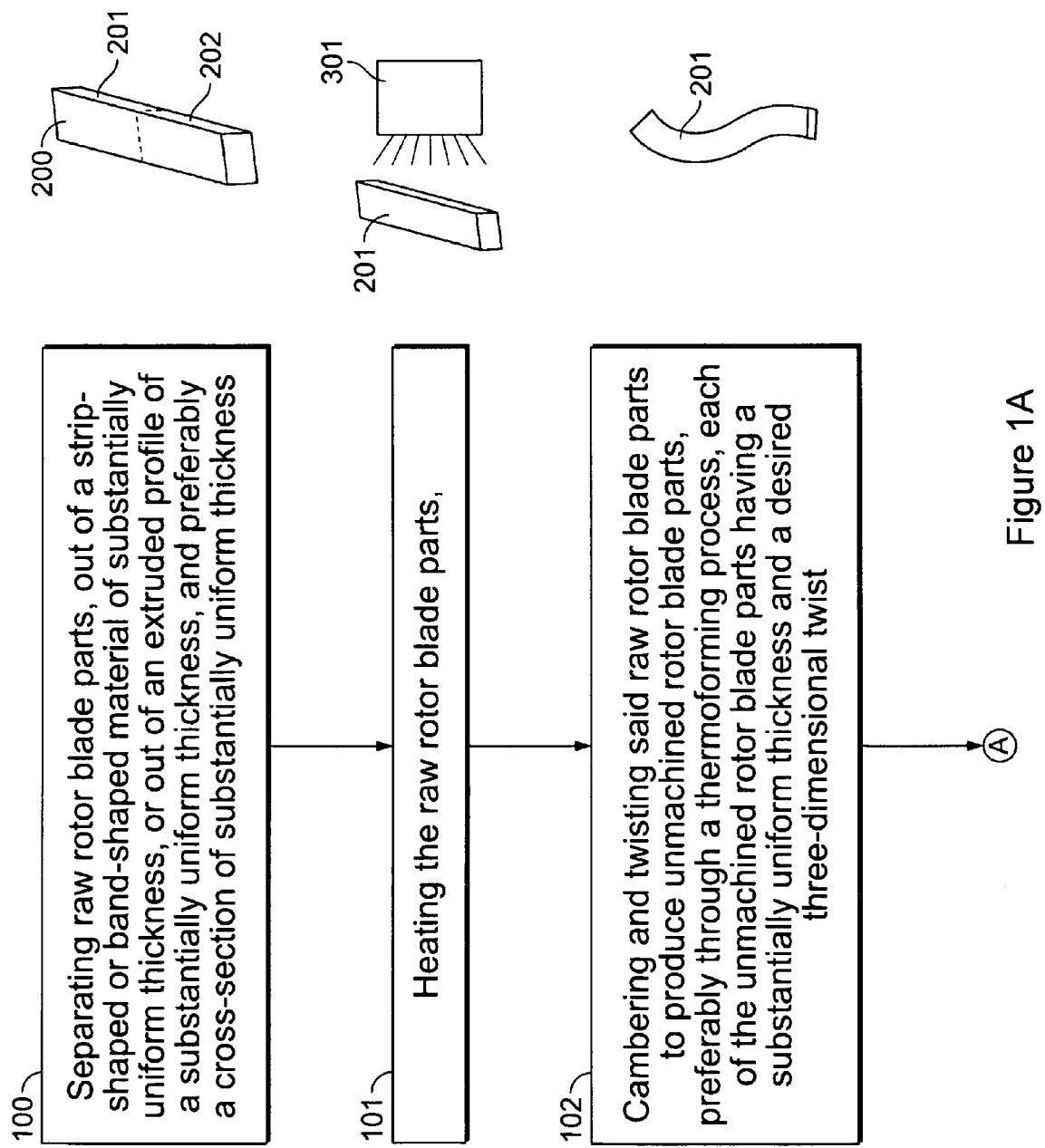
FIGS. 1A and 1B show an embodiment of the method of the present invention.
Figure 1B:
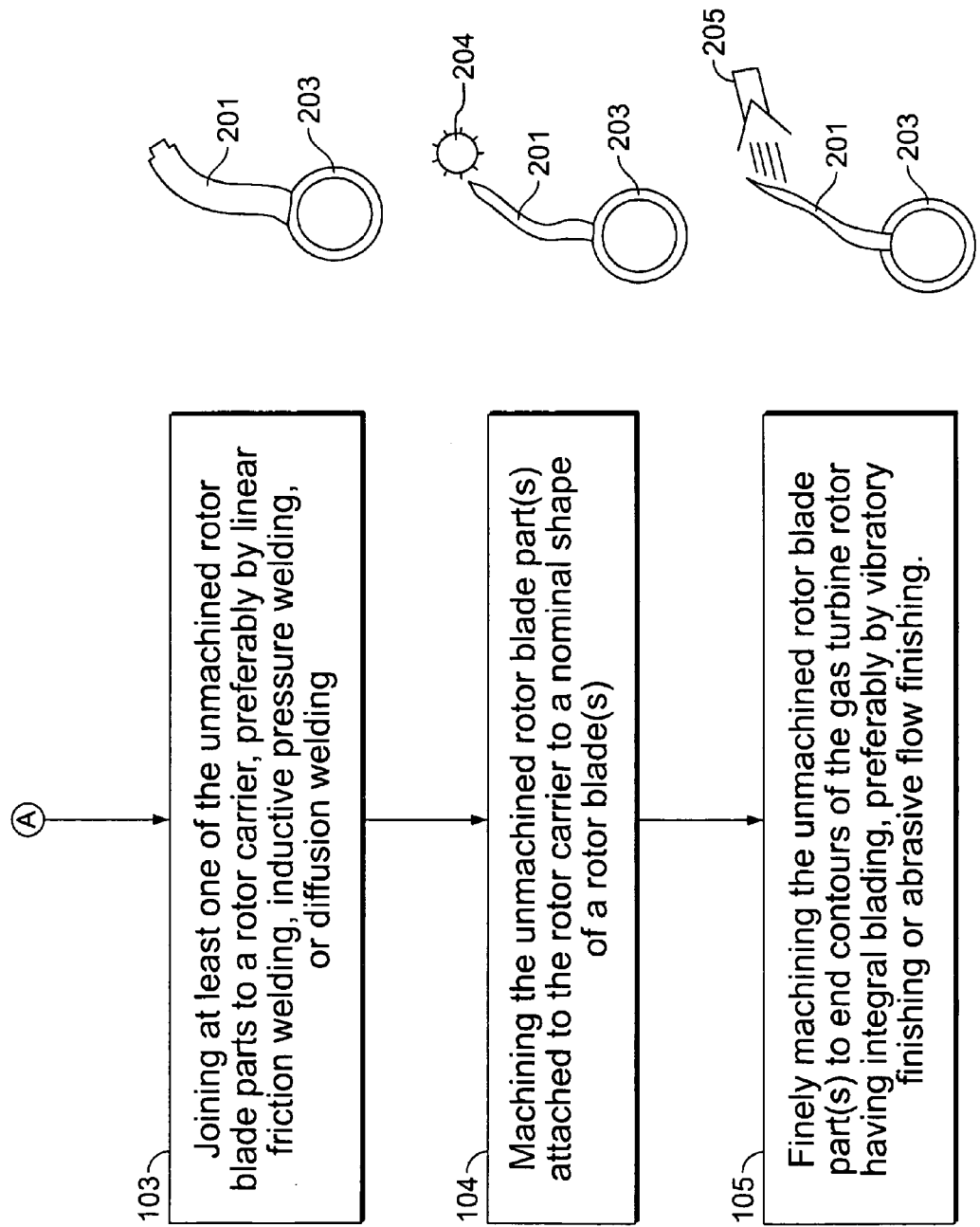

The method according to the present invention for manufacturing gas turbine rotors having integral blading is described in greater detail in the following description, and with reference to the process flow diagram of FIGS. 1A and 1B.

Unmachined rotor blade parts 201, 202 are manufactured in a first step. The unmachined rotor blade parts 201, 202 are preferably manufactured by separating raw parts out of a semifinished product 200, namely out of a strip-shaped or band-shaped material of approximately uniform thickness (step 100). Once they are separated out, these raw parts 201, 202 having an approximately uniform thickness in cross section are cambered and subsequently twisted (step 102). The cambering and twisting processes may also be carried out simultaneously. By cambering and twisting the originally flat raw parts that have been separated out of the strip-shaped or band-shaped material, unmachined rotor blade parts are produced, which, in fact, on the one hand, have a substantially constant thickness over the cross section, on the other hand, however, already have a desired spatial or three-dimensional orientation, a so-called three-dimensional twist. The cambering, as well as preferably subsequent twisting of the originally flat raw parts having a substantially uniform thickness are preferably carried out in a thermoforming process (steps 101-102). During the thermoforming process, the raw parts are heated (step 101) (shown schematically as heating 301) before being cambered and twisted as shown schematically next to block 102. This makes it possible to avoid stresses in the unmachined rotor blade part and to produce unmachined rotor blade parts having superior material properties.

One alternative in the manufacturing of unmachined rotor blade parts provides for separating the raw parts out of an already cambered, pressed profile, namely out of an already cambered, extruded profile (step 100), which has a substantially uniform or also a variable thickness. If the raw parts are separated out of an already cambered, extruded profile, then, following the separation process, they merely need to be still twisted in order to produce the desired three-dimensional twist. The twisting, in turn, is preferably carried out as a thermoforming process, to ensure higher quality material properties of the unmachined rotor blade parts.

The unmachined rotor blade parts manufactured in the above manner, having the desired three-dimensional twist and a preferably substantially uniform, i.e., constant thickness in cross section, are subsequently joined to a rotor carrier 203 (shown schematically) (step 103), in a second step of the method according to the present invention. The rotor carrier 203 may be designed to be disk-shaped or annular in cross section. When a rotor carrier that is disk-shaped in cross section is used, this is known as a blisk; when an annular rotor carrier is used, this is known as a bling.

It should be noted at this point that the unmachined rotor blade parts, as well as the rotor carrier are preferably made of either a nickel-based alloy or of a titanium-based alloy. However, all weldable materials, which are typically used today in gas turbine construction, may be machined using the method according to the present invention. Accordingly, the method of the present invention is suited both for manufacturing integrally bladed gas turbine rotors made of a nickel-based alloy, as well as for manufacturing integrally bladed gas turbine rotors made of a titanium-based alloy, or also of a steel alloy.

A welding process is preferably used to join the unmachined rotor blade parts to the rotor carrier (step 103). As welding processes, the linear friction welding known from the related art, inductive pressure welding, diffusion welding, or any other joining process used in known methods heretofore for manufacturing blisks, may be employed.

Once the unmachined rotor blade parts are joined to the rotor carrier, the actual shaping of the unmachined rotor blade parts to a desired nominal shape of the rotor blades of the gas turbine rotor follows. In this connection, the unmachined rotor blade parts having a substantially constant thickness in cross section are machined (shown schematically as machining 204) to produce rotor blades having a thickness adapted to the nominal shape of the same and varying in cross section. This means that, following this shaping operation, the rotor blades may have a different thickness in a peripheral region or in an edge region of the same than in a middle section. On the other hand, the thickness of the unmachined rotor blade parts is essentially constant throughout. Milling or electrochemical machining may be used for the requisite removal of material from the unmachined rotor blade parts.

The process of shaping the unmachined rotor blade parts to the nominal shape of the rotor blades is still preferably followed by a fine machining to end contours, this essentially being a surface machining of the rotor blades (step 105). This surface machining may be constituted, for example, of a vibratory finishing, chemically accelerated vibratory finishing, or of an abrasive flow machining (shown schematically as fine machining 205). The rotor blade surfaces or even the entire integrally bladed rotor may subsequently still be surface coated.

Accordingly, along the lines of the present invention, gas turbine rotors having integral blading are manufactured by producing unmachined rotor blade parts, attaching these unmachined rotor blade parts to a rotor carrier using a suitable joining process and, once the joining process is complete, actually shaping the unmachined rotor blade parts to the nominal shape of the rotor blades. The unmachined rotor blade parts are manufactured from a semifinished product, in particular from a band-shaped, sheet-metal panel or from an extruded profile, the unmachined rotor blade parts having a substantially uniform thickness in cross section. Unmachined rotor blade parts of this kind are able to be manufactured inexpensively, while entailing a low degree of complexity. Once the unmachined rotor blade parts are joined to the rotor carrier, they are machined to match the nominal shape of the rotor blades by milling, for example.

Numerous advantages are attainable over the related art by employing the method according to the present invention. It is thus possible to appreciably reduce the costs for manufacturing gas turbine rotors having integral blading. The need for purchasing substantially finish-machined rotor blades, or for manufacturing blisks from a solid blank, entailing substantial outlay for machining operations, is eliminated. This increases the value added share for the manufacturer of the integrally bladed gas turbine rotors.

What is claimed is:

1. A method for manufacturing a gas turbine rotor having an integral blading, comprising the steps of
producing unmachined rotor blade parts, the step of producing including:
separating raw rotor blade parts out of a strip-shaped or band-shaped material of substantially uniform thickness and, thereafter,
cambering and twisting said raw rotor blade parts to produce the unmachined rotor blade parts, each of the unmachined rotor blade parts having a substantially uniform thickness and a desired three-dimensional twist;
joining at least one of the unmachined rotor blade parts to a rotor carrier;
machining the at least one of the unmachined rotor blade parts attached to the rotor carrier to a nominal shape of a rotor blade, and thereafter,
finely machining the at least one of the unmachined rotor blade parts to end contours of the gas turbine rotor having the integral blading.

2. The method as recited in claim 1, further comprising heating the raw rotor blade parts prior to the cambering and twisting step.

3. The method as recited in claim 1, wherein the cambering and twisting are performed through a thermoforming process in order to provide desired the three-dimensional twist, wherein the separated-out raw rotor blade parts are heated for the cambering and twisting.

4. The method as recited in claim 1, wherein the unmachined rotor blade parts produced have a cross section of substantially uniform thickness.

5. The method as recited in claim 1, wherein each of the unmachined rotor blade parts is joined to the rotor carrier by one of linear friction welding, inductive pressure welding, and diffusion welding.

6. The method as recited in claim 1, wherein the unmachined rotor blade parts manufactured in the producing step have a substantially uniform thickness in cross section, and wherein the unmachined rotor blade parts undergo a shaping operation to produce rotor blades having a thickness adapted to a nominal shape of the unmachined rotor blade parts and having a varying cross section.

7. The method as recited in claim 6, wherein the shaping operation occurs during the step of machining the unmachined rotor blade parts to the nominal shape.

8. The method as recited in claim 6, the shaping operation includes subjecting the at least one of the unmachined rotor blade parts joined to the rotor carrier to a milling operation or an electrochemical machining operation.

9. The method as recited in claim 1, wherein the step of fine machining to end contours is performed via surface machining.

10. The method as recited in claim 9, wherein the surface machining includes vibratory finishing or abrasive flow machining.

11. A method for manufacturing a gas turbine rotor having an integral blading comprising the steps of
producing unmachined rotor blade parts, the step of producing including:
separating raw rotor blade parts out of an extruded profile of a substantially uniform thickness,
cambering and twisting said raw rotor blade parts to produce the unmachined rotor blade parts, each of the unmachined rotor blade parts having a substantially uniform thickness and a desired three-dimensional twist;
joining at least one of the unmachined rotor blade parts to a rotor carrier;
machining the at least one of the unmachined rotor blade parts attached to the rotor carrier to a nominal shape of a rotor blade, and thereafter,
finely machining the at least one of the unmachined rotor blade parts to end contours of the gas turbine rotor having the integral blading.

12. The method as recited in claim 11, further comprising heating the raw rotor blade parts prior to the twisting step.

13. The method as recited in claim 11, wherein the twisting is performed through a thermoforming process in order to provide a desired three-dimensional twist, wherein the separated-out raw rotor blade parts are heated for the twisting process.

14. The method as recited in claim 11, wherein the unmachined rotor blade parts produced have a cross section of substantially uniform thickness.

15. The method as recited in claim 11, wherein each of the unmachined rotor blade parts is joined to the rotor carrier by one of linear friction welding, inductive pressure welding, and diffusion welding.

16. The method as recited in claim 11, wherein the unmachined rotor blade parts manufactured in the producing step have a substantially uniform thickness in cross section, and wherein the unmachined rotor blade parts undergo a shaping operation to produce rotor blades having a thickness adapted to a nominal shape of the unmachined rotor blade parts and having a varying cross section.

17. The method as recited in claim 16, wherein the shaping operation occurs during the step of machining the unmachined rotor blade parts to the nominal shape.

18. The method as recited in claim 16, the shaping operation includes subjecting the at least one of the unmachined rotor blade parts joined to the rotor carrier to a milling operation or an electrochemical machining operation.

19. The method as recited in claim 11, wherein the step of fine machining to end contours is performed via surface machining.

20. The method as recited in claim 19, wherein the surface machining includes vibratory finishing or abrasive flow machining.

* * * * *